(12) United States Patent
Hamaya et al.

(10) Patent No.: US 10,137,597 B2
(45) Date of Patent: Nov. 27, 2018

(54) SPRAYED ARTICLE AND MAKING METHOD

(71) Applicant: SHIN-ETSU CHEMICAL CO., LTD., Tokyo (JP)

(72) Inventors: Noriaki Hamaya, Echizen (JP); Ryoji Iida, Echizen (JP); Noboru Yamamoto, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 926 days.

(21) Appl. No.: 14/509,927

(22) Filed: Oct. 8, 2014

(65) Prior Publication Data

US 2015/0099075 A1   Apr. 9, 2015

(30) Foreign Application Priority Data

Oct. 9, 2013   (JP) ................. 2013-211792

(51) Int. Cl.

| | | |
|---|---|---|
| *B28B 1/32* | (2006.01) | |
| *B28B 7/34* | (2006.01) | |
| *C04B 35/505* | (2006.01) | |
| *C04B 35/50* | (2006.01) | |
| *B22F 5/10* | (2006.01) | |
| *C04B 35/44* | (2006.01) | |
| *C04B 35/515* | (2006.01) | |
| *C04B 35/553* | (2006.01) | |
| *C04B 35/622* | (2006.01) | |
| *B28B 21/44* | (2006.01) | |
| *B22F 3/115* | (2006.01) | |
| *C22C 1/04* | (2006.01) | |
| *B22F 3/24* | (2006.01) | |

(52) U.S. Cl.
CPC ............... *B28B 1/32* (2013.01); *B22F 3/115* (2013.01); *B22F 5/10* (2013.01); *B22F 5/106* (2013.01); *B28B 7/342* (2013.01); *B28B 21/44* (2013.01); *C04B 35/44* (2013.01); *C04B 35/50* (2013.01); *C04B 35/505* (2013.01); *C04B 35/5156* (2013.01); *C04B 35/553* (2013.01); *C04B 35/62218* (2013.01); *C22C 1/045* (2013.01); *B22F 2003/247* (2013.01); *B22F 2003/248* (2013.01); *C04B 2235/3225* (2013.01); *C04B 2235/764* (2013.01); *C04B 2235/94* (2013.01); *C04B 2235/95* (2013.01); *Y10T 428/131* (2015.01)

(58) Field of Classification Search
CPC ........... B28B 1/32; B28B 7/342; B28B 21/44; C04B 35/505; C04B 35/50; C04B 35/44; C04B 35/5156; C04B 35/553; C04B 35/62218; C04B 2235/3225; C04B 2235/764; C04B 2235/94; C04B 2235/95; B22F 5/10; B22F 2003/248; B22F 2003/247; B22F 3/115; B22F 5/106; Y10T 428/131; C22C 1/045

See application file for complete search history.

(56) References Cited

U.S. PATENT DOCUMENTS

| | | | |
|---|---|---|---|
| 4,713,284 A | 12/1987 | Hasegawa et al. | |
| 2009/0324916 A1 | 12/2009 | Hamaya et al. | |

FOREIGN PATENT DOCUMENTS

| | | | |
|---|---|---|---|
| JP | S63-212506 | A | 9/1988 |
| JP | H04-266475 | A | 9/1992 |
| JP | 4-506336 | A | 11/1992 |
| JP | 6-33215 | A | 2/1994 |
| JP | H06-145945 | A | 5/1994 |
| JP | 6-55477 | B2 | 7/1994 |
| JP | 10-204655 | A | 8/1998 |
| JP | 2003-311404 | A | 11/2003 |
| JP | 2004-107718 | A | 4/2004 |
| JP | 2004-346374 | A | 12/2004 |
| JP | 2005-186125 | A | 7/2005 |
| JP | 2008-285734 | A | 11/2008 |

OTHER PUBLICATIONS

JP2005-186125, English machine translation.*
Office Action dated Jul. 25, 2017, issued in counterpart Japanese Application No. 2014-203733, with English machine translation. (9 pages).
Office Action dated Apr. 17, 2018, issued in counterpart Japanese Application No. 2014-203733, with English machine transaltion. (7 pages).

* cited by examiner

*Primary Examiner* — Michael C Miggins
(74) *Attorney, Agent, or Firm* — Westerman, Hattori, Daniels & Adrian, LLP

(57) ABSTRACT

A sprayed article is prepared by thermally spraying ceramic particles of rare earth oxide or fluoride or metal particles of W, Mo or Ta onto an outer or inner surface of a cylindrical carbon substrate to form a sprayed coating, and burning out the carbon substrate, thus leaving the ceramic or metal-base sprayed coating of cylindrical shape having a wall thickness of 0.5-5 mm.

10 Claims, No Drawings

SPRAYED ARTICLE AND MAKING METHOD

CROSS-REFERENCE TO RELATED APPLICATION

This non-provisional application claims priority under 35 U.S.C. § 119(a) on Patent Application No. 2013-211792 filed in Japan on Oct. 9, 2013, the entire contents of which are hereby incorporated by reference.

TECHNICAL FIELD

This invention relates to ceramic or heat-resistant metal-base sprayed articles of hollow cylinder or cup shape and a method for preparing the same.

BACKGROUND ART

Cylindrical or cup (crucible) shape ceramic articles of rare earth oxides or fluorides are generally prepared by molding methods including mold pressing, rubber pressing (or isostatic pressing), slip casting, and doctor blade methods. There is furnished rare earth oxide powder for a particular molding method. The powder is molded into ceramic compacts of cylindrical or cup shape by any molding methods. The compacts are subjected to firing, sintering and working steps until they are finished into products of the predetermined size. Molded articles of heat-resistant metals, typically tungsten (W) are similarly prepared.

However, where it is desired to produce thin-wall articles, especially having a thickness of up to 5 mm, the standard molding methods are difficult to produce acceptable molded articles because cracking occurs during the molding step. One common solution to this problem involves molding compacts having a greater thickness so as to ensure higher yields of compact formation, firing and sintering the compacts, and grinding or otherwise machining the compacts to a wall thickness of up to 5 mm.

This method, however, is disadvantageous in that as the final article becomes thinner in wall thickness or greater in volume, the method requires a more amount of source material and a longer time for product finishing. Because of cracking and warpage during sintering, the yield of overall manufacture is substantially reduced, resulting in an increased cost. This is a problem in the manufacture of ceramic or metal articles.

CITATION LIST

Patent Document 1: JP-A H10-204655
Patent Document 2: JP-A H06-033215
Patent Document 3: JP-A 2004-346374
Patent Document 4: JP-B H06-55477
Patent Document 5: JP-A 2008-285734 (US 20090324916)

DISCLOSURE OF INVENTION

An object of the invention is to provide a method of preparing a sprayed shaped article consisting of a sprayed coating in high yields while minimizing a loss of source material; and a sprayed shaped article which is useful as equipment members requiring inertness, heat resistance, abrasion resistance, corrosion resistance, plasma resistance and chemical resistance.

The inventors have found that a sprayed shaped article which experiences minimal warpage or deformation despite thin wall is prepared by thermally spraying ceramic particles of rare earth oxide or fluoride or metal particles of W, Mo or Ta onto a surface of a carbon substrate of cylindrical or cup shape to form a sprayed coating, and burning out the carbon substrate, thus leaving the sprayed coating of cylindrical or cup shape having a reduced thickness.

In one aspect, the invention provides a method for preparing a sprayed article, comprising the steps of:
providing a carbon substrate of cylindrical shape having outer and inner circumferential surfaces,
thermally spraying ceramic particles of a rare earth oxide and/or rare earth fluoride or metal particles of at least one type selected from W, Mo and Ta, onto the outer or inner circumferential surface of the carbon substrate to form a sprayed coating, and
combustion treating the coated substrate to burn out the carbon substrate, thus leaving the ceramic or metal-base sprayed coating of cylindrical shape having a wall thickness of 0.5 to 5 mm.

In another aspect, the invention provides a method for preparing a sprayed article, comprising the steps of:
providing a carbon substrate of cup shape having outer and inner circumferential surfaces and outer and inner bottom surfaces,
thermally spraying ceramic particles of a rare earth oxide and/or rare earth fluoride or metal particles of at least one type selected from W, Mo and Ta, onto the outer circumferential and bottom surfaces or inner circumferential and bottom surfaces of the carbon substrate to form a sprayed coating, and
combustion treating the coated substrate to burn out the carbon substrate, thus leaving the ceramic or metal-base sprayed coating of cup shape having a wall thickness of 0.5 to 5 mm.

In a preferred embodiment, only the step of combustion treating the coated substrate is sufficient to burn out the carbon substrate.

In a preferred embodiment, the method may further comprise the step of machining the carbon substrate to reduce its wall thickness prior to the combustion treating step, and the step of combustion treating the coated substrate is sufficient to burn out the remaining carbon substrate.

In a preferred embodiment, the step of combustion treating the coated substrate includes heating the coated substrate at a temperature of 800° C. to 1,700° C. in an oxidizing atmosphere.

In a preferred embodiment, the method may further comprise the step of roughening the surface of the carbon substrate to be sprayed, prior to the spraying step.

In a preferred embodiment, the spraying step includes alternately spraying ceramic particles of different rare earth oxides, or alternately spraying ceramic particles of a rare earth oxide and ceramic particles of a rare earth fluoride to form the sprayed coating.

In a further aspect, the invention provides a sprayed article consisting of a sprayed coating of cylindrical or cup shape comprising a rare earth oxide and/or rare earth fluoride ceramic material or at least one metal selected from W, Mo and Ta, and having a wall thickness of 0.5 to 5 mm.

In a preferred embodiment, the sprayed article is obtained by forming a sprayed coating of ceramic particles of a rare earth oxide and/or rare earth fluoride or metal particles of at least one type selected from W, Mo and Ta on an outer or inner circumferential surface of a carbon substrate of cylindrical shape, and removing the carbon substrate therefrom, thus leaving the sprayed coating, the sprayed article consisting of the ceramic or metal-base sprayed coating of cylindrical shape having a wall thickness of 0.5 to 5 mm.

In a preferred embodiment, the sprayed article is obtained by forming a sprayed coating of ceramic particles of a rare earth oxide and/or rare earth fluoride or metal particles of at least one type selected from W, Mo and Ta on outer circumferential and bottom surfaces or inner circumferential and bottom surfaces of a carbon substrate of cup shape, and removing the carbon substrate therefrom, thus leaving the sprayed coating, the sprayed article consisting of the ceramic or metal-base sprayed coating of cup shape having a wall thickness of 0.5 to 5 mm.

The sprayed article is preferably made of the rare earth oxide and/or rare earth fluoride.

In a preferred embodiment, the sprayed coating comprises alternately sprayed layers of different rare earth oxides, or alternately sprayed layers of a rare earth oxide and a rare earth fluoride.

Also preferably, the sprayed article is made of at least one metal selected from W, Mo and Ta.

Advantageous Effects of Invention

According to the invention, a sprayed shaped article is prepared by thermally spraying ceramic particles or metal particles onto a carbon substrate of cylindrical or cup shape to form a sprayed coating, and burning out the carbon substrate. The sprayed article consisting of the sprayed coating of cylindrical or cup shape having a thin wall can be prepared easily without a need for molding, firing and sintering steps involved in the conventional methods. The sprayed article is useful as members in a variety of applications requiring inertness, heat resistance, abrasion resistance, corrosion resistance, plasma resistance and chemical resistance.

DESCRIPTION OF PREFERRED EMBODIMENTS

A first embodiment of the invention is a method for preparing a sprayed shaped article, comprising the steps of providing a carbon substrate of cylindrical shape having outer and inner circumferential surfaces, thermally spraying ceramic particles of a rare earth oxide and/or rare earth fluoride or metal particles of at least one type selected from W, Mo and Ta, onto the outer or inner circumferential surface of the carbon substrate to form a sprayed coating, and combustion treating the coated substrate to burn out the carbon substrate, thus leaving the ceramic or metal-base sprayed coating of cylindrical shape having a wall thickness of 0.5 to 5 mm, the sprayed article being the sprayed coating alone.

A second embodiment of the invention is a method for preparing a sprayed shaped article, comprising the steps of providing a carbon substrate of cup shape having outer and inner circumferential surfaces and outer and inner bottom surfaces, thermally spraying ceramic particles of a rare earth oxide and/or rare earth fluoride or metal particles of at least one type selected from W, Mo and Ta, onto the outer circumferential and bottom surfaces or inner circumferential and bottom surfaces of the carbon substrate to form a sprayed coating, and combustion treating the coated substrate to burn out the carbon substrate, thus leaving the ceramic or metal-base sprayed coating of cup shape having a wall thickness of 0.5 to 5 mm, the sprayed article being the sprayed coating alone.

Below the methods of the invention are described in detail.

First, there is furnished a carbon substrate of predetermined dimensions and a source powder for thermal spraying.

The carbon substrate used herein corresponds to a mold used in the standard ceramic molding step. It may be formed by any techniques such as cold isostatic pressing (CIP), extrusion, molding, and compaction (typically, composite body obtained by compacting fibrous carbon). Of these, CIP carbon substrates are preferred.

The shape of the carbon substrate may be a hollow cylinder, i.e., round pipe which is open at both ends or a cylindrical cup or crucible, i.e., bottomed round pipe which is open at one end and has a bottom at the other end. Notably, the hollow cylinder has outer and inner circumferential surfaces, and the cylindrical cup has outer and inner circumferential surfaces and outer and inner bottom surfaces. When the circumferential wall of the substrate is perforated with a plurality of through-holes, a sprayed article of cylindrical or cup shape having corresponding through-holes in its circumferential wall can be prepared.

The dimensions of the carbon substrate are not particularly limited as long as the substrate is amenable to thermal spraying. For example, the substrate preferably has an outer diameter of 100 to 1,000 mm, more preferably 200 to 600 mm, and an inner diameter of 80 to 980 mm, more preferably 180 to 580 mm. The thickness of the carbon substrate is a difference between the outer and inner radii. The carbon substrate should preferably be thick enough to ensure that the substrate is handled or supported during thermal spraying and has a sufficient rigidity to withstand stresses of sprayed coating, and thin enough to ensure that the substrate is readily removed in the later combustion step. Specifically, the thickness of the carbon substrate (or circumferential wall) is preferably 3 to 20 mm, more preferably 5 to 15 mm. In the case of cup shape, the thickness of the bottom is preferably equal to the thickness of the circumferential wall.

The source powder for thermal spraying is ceramic particles comprising a rare earth oxide and/or rare earth fluoride or metal particles of at least one type selected from W, Mo and Ta.

The rare earth oxides and fluorides used herein include oxides and fluorides of yttrium (Y) and lanthanoids, specifically oxides and fluorides of elements selected from yttrium (Y) and rare earth elements having atomic number 57 to 71, which may be used alone or in admixture. The preferred rare earth oxides are oxides of Y and Er. The preferred rare earth fluorides are fluorides of Y and Er. Also a mixture of a rare earth oxide with an oxide of another metal, typically Group 3B metal element is useful as well as a complex oxide of a rare earth oxide and an oxide of another metal, typically Group 3B metal element. Exemplary of the Group 3B metal are B, Al, Ga, In, and Ti elements. Where a mixture or complex oxide of a rare earth oxide and another metal oxide is used, the content of rare earth oxide is preferably 10% to 90% by weight, and more preferably 30% to 80% by weight based on the total weight of rare earth and other metal oxides.

The metal is at least one metal selected from tungsten (W), molybdenum (Mo) and tantalum (Ta), and preferably W or Mo.

The source powder to be sprayed preferably has an average particle size of 3 to 70 μm, and more preferably 15 to 60 μm. The average particle size as used herein is a $D_{50}$ value (non-variance) as determined by the microtrack method.

In the method of the invention, the source powder is thermally sprayed onto the carbon substrate. Prior to the spraying, the carbon substrate is preferably surface treated or roughened by shot blasting or similar technique. Preferably the surface of the carbon substrate is roughened to such an extent as to improve the adhesion of sprayed coating thereto.

Once the carbon substrate is prepared, the source powder is sprayed thereon. The type of thermal spraying is not particularly limited although plasma spraying is preferred. Under preferred thermal spraying conditions, for example, a plasma gas of argon gas in admixture with hydrogen gas, a current flow of 500 amperes, and a power of 35 kW, a sprayed coating is deposited on the carbon substrate to the predetermined thickness.

The thickness of the sprayed coating, which eventually becomes the wall thickness of the sprayed article, is specifically up to 5 mm, preferably up to 4 mm, more preferably up to 3.5 mm, and most preferably up to 2.5 mm. The minimum thickness is preferably at least 0.5 mm, more preferably at least 1.0 mm, from the standpoint of preventing the sprayed article from being damaged during handling.

Thermal stresses arise in the sprayed coating from such factors as the shape (size, thickness, etc.) and surface state as shot blasted of the carbon substrate, and the difference between physical properties (coefficient of thermal expansion, modulus, etc.) of the carbon substrate and the physical properties (coefficient of thermal expansion, modulus, etc.) of the sprayed coating. Particularly in the case of a large size carbon substrate, if the physical properties, thickness and surface state of the carbon substrate do not match with the sprayed coating, the sprayed coating develops cracks when it stands alone after removal of the carbon substrate. Then the desired article of hollow cylinder or cup shape is not available. It is then preferred to select parameters of the carbon substrate and spraying material appropriate so as to suppress the generation of thermal stresses.

Next, combustion treatment is carried out to burn out the carbon substrate, i.e., to remove the carbon substrate.

In this step, preferably only the combustion treatment is sufficient to remove the carbon substrate. Then, the carbon substrate can be removed without increasing the number of steps. Alternatively, the carbon substrate is machined to reduce its wall thickness before combustion treatment is carried out to burn out the remaining carbon substrate. This reduces the time required until the carbon substrate is removed.

The combustion treatment to burn out the carbon substrate preferably includes heating the coated substrate at a temperature of 800° C. to 1,700° C. in an oxidizing atmosphere. Specifically, the sprayed coating-bearing carbon substrate is placed in an oxidizing atmosphere furnace where heat treatment is carried out by heating at a temperature of 800° C. to 1,700° C. and holding the temperature for a certain time, typically 30 minutes to 5 hours, until the carbon substrate is burnt out. If the heating temperature is below 800° C., burning of the carbon substrate may be insufficient. If the heating temperature exceeds 1,700° C., the sprayed coating may be degraded. The oxidizing atmosphere is an atmosphere containing oxidizing gas. For example, the furnace is filled with a gas mixture of oxygen and an inert gas (e.g., Ar) having an oxygen partial pressure of at least 0.02 MPa.

In the step, the carbon substrate is burnt out, i.e., is eventually removed, leaving the sprayed coating of hollow cylinder or cup shape and carbon substrate residues. There is obtained the sprayed article of hollow cylinder or cup shape that has utilized the carbon substrate as mold.

On the surface of the sprayed coating in contact with the carbon substrate, there may be left behind carbon substrate residues. Such residues may be removed by blasting, machining, chemical treatment, firing or the like.

After removal of the carbon substrate, the sprayed coating may be somewhat deformed (e.g., warped or distorted) due to thermal stresses. Such deformation can be avoided by carefully tailoring the shape of the carbon substrate. Alternatively, such deformation can be corrected by additional thermal spraying on the surface of the sprayed coating that has been in contact with the carbon substrate until finishing to the desired thickness.

By the method of the invention, there is obtained a ceramic or metal-base thin-wall sprayed article, which consists of a sprayed coating of hollow cylinder or cup shape whose thickness is unchanged from the thickness as sprayed. That is, a ceramic or metal shaped body having a wall thickness of up to 5 mm, which is susceptible to cracks or strains during molding if molded by conventional techniques such as mold pressing, rubber pressing (isostatic pressing), slip casting, doctor blade and the like, can be readily prepared by forming a sprayed coating of ceramic or metal particles on the outer or inner circumferential surface of a cylindrical shape carbon substrate or on the outer circumferential and bottom surfaces or inner circumferential and bottom surfaces of a cup shape carbon substrate, and removing the carbon substrate from the sprayed coating, with the advantages of causing neither cracks nor distortion to the ceramic or metal shaped body and eliminating a need for machining operation to reduce the wall thickness. Specifically, the sprayed shaped body may have a wall thickness of up to 5 mm, preferably up to 4 mm, more preferably up to 3.5 mm, and even more preferably up to 2.5 mm. The minimum thickness is preferably at least 0.5 mm, more preferably at least 1.0 mm from the aspect of preventing damage by handling.

As a variant of the inventive method, a sprayed article of hollow cylinder or cup shape can be prepared by alternately thermally spraying ceramic particles of different rare earth oxides, or alternately thermally spraying ceramic particles of a rare earth oxide and ceramic particles of a rare earth fluoride to form a sprayed coating. For example, from a sprayed coating obtained by alternately depositing a sprayed layer of yttrium oxide and a sprayed layer of erbium oxide, each having a thickness of 200 μm, a shaped article of hollow cylinder shape having a wall thickness of about 3 mm can be prepared. Also, between the sprayed layers of rare earth oxide and/or fluoride, a sprayed layer of another metal or metal compound may intervene. A composite shaped article of rare earth oxide and/or fluoride, which cannot be prepared by standard ceramic molding techniques, can be prepared. In the application requiring high purity, a sprayed article of high purity can be prepared by taking suitable means, such as, furnishing a carbon substrate and source powder of high purity, conducting thermal spraying in a clean environment, and effecting post-treatment such as acid washing, alkali washing, organic solvent washing, heat treatment, or precision cleaning.

Depending on the intended application, the resulting sprayed shaped article of cylinder or cup shape may be used as such or machined prior to use. Namely, the sprayed article may be machined, for example, by cutting, drilling, grinding, polishing or mirror polishing, whereby it is finished to the desired shape and surface state so that it is ready for use.

The sprayed article manufactured by the invention is advantageously used as members in a variety of applications where non-reactivity, heat resistance, abrasion resistance, corrosion resistance, plasma resistance, and/or chemical resistance are required, for example, members (which must be plasma resistant) in semiconductor device processing chambers, laminate members having an electrode pattern of tungsten or the like formed therein and capable of producing an electrostatic force such as members in electrostatic chucks, and setters used in sintering of magnet alloys.

EXAMPLE

Examples of the invention are given below by way of illustration, but not by way of limitation.

Example 1

There was furnished a hollow carbon cylinder (CIP carbon substrate) having an outer diameter (OD) of 300 mm, an inner diameter (ID) of 294 mm, and a height (H) of 100 mm. The outer circumferential surface of the cylinder was roughened by shot blasting. Using a source powder of $Y_2O_3$ and a plasma gas of argon having hydrogen added thereto (argon/hydrogen gas), plasma spraying was carried out on the roughened surface. A sprayed $Y_2O_3$ coating was deposited on the outer circumferential surface of the carbon cylinder. Plasma spraying was terminated when the coating reached a thickness of 2 mm.

The $Y_2O_3$-coated carbon cylinder was placed in an oxidizing atmosphere furnace, where it was heated at 800° C. to burn out the carbon cylinder. With the furnace returned to room temperature, there was obtained a hollow cylindrical sprayed $Y_2O_3$ body having an OD of 305 mm, an ID of 301 mm, a height of 100 mm and a wall thickness of 2 mm, that is, $Y_2O_3$ ceramic cylinder from which the carbon cylinder had been removed (Example 1-1).

Using a 3D measuring instrument (model RVA1000A, Tokyo Seimitsu Co., Ltd.), the $Y_2O_3$ ceramic cylinder of Example 1-1 was measured for OD, ID and roundness. With respect to the measuring positions, "top", "middle" and "bottom" positions correspond to the upper end, center (in height direction) and lower end of the upright standing cylinder, respectively. Roundness was determined by the least squares center (LSC) method. Notably, the same measurements apply hereinafter. The results are shown in Table 1.

Next, an attempt was made to improve the roundness of the $Y_2O_3$ ceramic cylinder of Example 1-1. Namely, on the inner circumferential surface of the ceramic cylinder, a coating (sprayed $Y_2O_3$ coating of 1 mm thick) was deposited by plasma spraying under the same conditions as above. The dual-sprayed $Y_2O_3$ body of cylindrical shape ($Y_2O_3$ ceramic cylinder) had an OD of 305 mm, an ID of 299 mm, and a height of 100 mm (Example 1-2).

Using the 3D measuring instrument, the $Y_2O_3$ ceramic cylinder of Example 1-2 was measured for OD, ID and roundness. The results are shown in Table 1. By additional thermal spraying on the inner surface, the ceramic cylinder was improved in roundness.

TABLE 1

| Cylinder | Measuring position | Diameter (mm) | | Roundness (mm) | |
| --- | --- | --- | --- | --- | --- |
| | | ID | OD | ID | OD |
| Example 1-1 | top | 301.08 | 305.73 | 2.228 | 2.237 |
| | center | 301.12 | 305.84 | 2.175 | 2.169 |
| | bottom | 301.17 | 305.83 | 2.125 | 2.170 |
| Example 1-2 | top | 299.15 | 305.80 | 0.162 | 0.201 |
| | center | 299.10 | 305.79 | 0.194 | 0.154 |
| | bottom | 299.17 | 305.81 | 0.250 | 0.178 |

Example 2

There was furnished a carbon crucible (carbon cup or CIP carbon substrate) having an OD of 300 mm, an ID of 294 mm, and a height of 100 mm. The outer circumferential and bottom surfaces of the crucible were roughened by shot blasting. Using a source powder of $Y_2O_3$ and argon/hydrogen gas, plasma spraying was carried out on the roughened surface. A sprayed $Y_2O_3$ coating was deposited on the outer circumferential and bottom surfaces of the carbon crucible. Plasma spraying was terminated when the coating reached a thickness of 2 mm.

The $Y_2O_3$-coated carbon crucible was placed in an oxidizing atmosphere furnace, where it was heated at 800° C. to burn out the carbon crucible. With the furnace returned to room temperature, there was obtained a cup-shape sprayed $Y_2O_3$ body having an OD of 305 mm, an ID of 301 mm, a height of 102 mm and a wall thickness of 2 mm, that is, $Y_2O_3$ ceramic crucible from which the carbon crucible had been removed.

Example 3

There was furnished a hollow carbon cylinder (CIP carbon substrate) having an OD of 300 mm, an ID of 294 mm, and a height of 100 mm. The outer circumferential surface of the cylinder was roughened by shot blasting. Using a source powder of $YF_3$ and argon/hydrogen gas, plasma spraying was carried out on the roughened surface. A sprayed $YF_3$ coating was deposited on the outer circumferential surface of the carbon cylinder. Plasma spraying was terminated when the coating reached a thickness of 2 mm.

The $YF_3$-coated carbon cylinder was placed in an oxidizing atmosphere furnace, where it was heated at 800° C. to burn out the carbon cylinder. With the furnace returned to room temperature, there was obtained a hollow cylinder-shape sprayed $YF_3$ body having an OD of 305 mm, an ID of 301 mm, a height of 100 mm and a wall thickness of 2 mm, that is, $YF_3$ ceramic cylinder from which the carbon cylinder had been removed.

Example 4

There was furnished a carbon crucible (carbon cup or CIP carbon substrate) having an OD of 300 mm, an ID of 294 mm, and a height of 100 mm. The outer circumferential and bottom surfaces of the crucible were roughened by shot blasting. Using a source powder of $YF_3$ and argon/hydrogen gas, plasma spraying was carried out on the roughened surface. A sprayed $YF_3$ coating was deposited on the outer circumferential and bottom surfaces of the carbon crucible. Plasma spraying was terminated when the coating reached a thickness of 2 mm.

The $YF_3$-coated carbon crucible was placed in an oxidizing atmosphere furnace, where it was heated at 800° C. to burn out the carbon crucible. With the furnace returned to room temperature, there was obtained a cup-shape sprayed YF$_3$ body having an OD of 305 mm, an ID of 301 mm, a height of 102 mm and a wall thickness of 2 mm, that is, YF$_3$ ceramic crucible from which the carbon crucible had been removed.

Example 5

There was furnished a carbon crucible (carbon cup or CIP carbon substrate) having an OD of 300 mm, an ID of 294 mm, and a height of 100 mm. The outer circumferential and bottom surfaces of the crucible were roughened by shot blasting. Using a source powder of tungsten (W) and argon/hydrogen gas, plasma spraying was carried out on the roughened surface. A sprayed W coating was deposited on the outer circumferential and bottom surfaces of the carbon crucible. Plasma spraying was terminated when the coating reached a thickness of 2 mm.

The W-coated carbon crucible was placed in an oxidizing atmosphere furnace, where it was heated at 800° C. to burn out the carbon crucible. With the furnace returned to room temperature, there was obtained a cup-shape sprayed W body having an OD of 305 mm, an ID of 301 mm, a height of 102 mm and a wall thickness of 2 mm, that is, W metal crucible from which the carbon crucible had been removed.

Example 6

There was furnished a hollow carbon cylinder (CIP carbon substrate) having an OD of 300 mm, an ID of 294 mm, and a height of 100 mm. The outer circumferential surface of the cylinder was roughened by shot blasting. Using a source powder of Y$_2$O$_3$ and argon/hydrogen gas, plasma spraying was carried out on the roughened surface. A sprayed Y$_2$O$_3$ coating was deposited on the outer circumferential surface of the carbon cylinder. Plasma spraying was terminated when the coating reached a thickness of 2 mm.

Another coating was deposited by plasma spraying using a source powder of yttrium aluminum garnet (YAG) and argon/hydrogen gas. A sprayed YAG coating was deposited on the Y$_2$O$_3$ coating. Plasma spraying was terminated when the YAG coating reached a thickness of 2 mm.

The (Y$_2$O$_3$+YAG)-coated carbon cylinder was placed in an oxidizing atmosphere furnace, where it was heated at 800° C. to burn out the carbon cylinder. With the furnace returned to room temperature, there was obtained a hollow cylinder-shape sprayed Y$_2$O$_3$+YAG body having an OD of 309 mm, an ID of 301 mm, a height of 100 mm and a wall thickness of 4 mm, that is, Y$_2$O$_3$+YAG ceramic cylinder from which the carbon cylinder had been removed.

Example 7

There was furnished a hollow carbon cylinder (CIP carbon substrate) having an OD of 300 mm, an ID of 294 mm, and a height of 100 mm. The inner circumferential surface of the cylinder was roughened by shot blasting. Using a source powder of Y$_2$O$_3$ and argon/hydrogen gas, plasma spraying was carried out on the roughened surface. A sprayed Y$_2$O$_3$ coating was deposited on the inner surface of the carbon cylinder. Plasma spraying was terminated when the coating reached a thickness of 2 mm.

The Y$_2$O$_3$-coated carbon cylinder was placed in an oxidizing atmosphere furnace, where it was heated at 800° C. to burn out the carbon cylinder. With the furnace returned to room temperature, there was obtained a hollow cylinder-shape sprayed Y$_2$O$_3$ body having an OD of 294 mm, an ID of 290 mm, a height of 100 mm and a wall thickness of 2 mm, that is, Y$_2$O$_3$ ceramic cylinder from which the carbon cylinder had been removed.

Example 8

There was furnished a hollow carbon cylinder (CIP carbon substrate) having an OD of 300 mm, an ID of 294 mm, and a height of 100 mm. The inner circumferential surface of the cylinder was roughened by shot blasting. Using a source powder of Y$_2$O$_3$ and argon/hydrogen gas, plasma spraying was carried out on the roughened surface. A sprayed Y$_2$O$_3$ coating was deposited on the inner surface of the carbon cylinder. Plasma spraying was terminated when the coating reached a thickness of 2 mm.

The carbon cylinder on the outside was machined by dry grinding. The Y$_2$O$_3$-coated carbon cylinder was placed in an oxidizing atmosphere furnace, where it was heated at 800° C. to burn out the remaining carbon cylinder. With the furnace returned to room temperature, there was obtained a hollow cylinder-shape sprayed Y$_2$O$_3$ body having an OD of 294 mm, an ID of 290 mm, a height of 100 mm and a wall thickness of 2 mm, that is, Y$_2$O$_3$ ceramic cylinder from which the carbon cylinder had been removed.

Comparative Example 1

There was furnished a mold defining a cavity having an OD of 300 mm, an ID of 294 mm, and a height of 100 mm. The mold cavity was filled with Y$_2$O$_3$ source powder, which was press molded to form a compact having a wall thickness of 3 mm. The compact cracked when it was released from the press mold, failing to obtain a molded Y$_2$O$_3$ body of cylindrical shape.

Comparative Example 2

There were furnished a neoprene rubber mold having a diameter of 300 mm and a height of 100 mm, a metal insert having a diameter of 290 mm and a height of 100 mm, and a rubber lid. The mold cavity was filled with Y$_2$O$_3$ source powder, which was molded under a hydraulic pressure of 2 ton/cm$^2$ using a cold isostatic pressing machine. There was obtained a molded compact having an OD of 296 mm, an ID of 290 mm and a height of 100 mm, with cylinder edges partially chipped away. The compact had a thin wall and a low strength, and cracked when the metal insert was withdrawn, failing to obtain an acceptable molded part.

Comparative Example 3

There were furnished a neoprene rubber mold having a diameter of 300 mm and a height of 100 mm, a metal insert having a diameter of 250 mm and a height of 100 mm, and a rubber lid. The mold cavity was filled with Y$_2$O$_3$ source powder, which was molded under a hydraulic pressure of 2 ton/cm$^2$ using a cold isostatic pressing machine. There was obtained a molded compact having an OD of 290 mm, an ID of 250 mm and a height of 100 mm. The compact had a wall thickness of 20 mm.

Next, the compact was placed in an oxidizing atmosphere furnace where it was fired at 1,700° C., obtaining a sintered body having an OD of 285 mm, an ID of 245 mm, and a height of 95 mm.

Since the sintered body had a thick wall (20 mm), it was ground on its outer surface until the wall thickness was reduced below 5 mm. Grinding required a long time until the OD was reduced to 255 mm. Cracks generated in the course of machining, indicating a high failure rate. It was difficult to obtain an acceptable $Y_2O_3$ ceramic body of cylindrical shape.

Japanese Patent Application No. 2013-211792 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A sprayed article consisting of a sprayed body of cylindrical or cup shape comprising a rare earth oxide and/or rare earth fluoride ceramic material and having a wall thickness of 0.5 to 5 mm and an inner diameter at its cylinder portion of 200 to 600 mm and a sprayed coating comprising a rare earth oxide and/or rare earth fluoride ceramic material formed on the inner circumferential surface of the cylinder portion of the sprayed body,
wherein the cylinder portion of the sprayed article has an ID roundness of 0.25 mm or less and/or an OD roundness of 0.20 mm or less.

2. The sprayed article of claim 1, wherein the sprayed body is obtained by forming a sprayed coating of ceramic particles of a rare earth oxide and/or rare earth fluoride on an outer circumferential surface of a carbon substrate of cylindrical shape, and removing the carbon substrate therefrom, thus leaving the sprayed coating as a sprayed body,
the sprayed body consisting of the ceramic sprayed coating of cylindrical shape having a wall thickness of 0.5 to 5 mm and an inner diameter of 200 to 600 mm.

3. The sprayed article of claim 1, wherein the sprayed body is obtained by forming a sprayed coating of ceramic particles of a rare earth oxide and/or rare earth fluoride on outer circumferential and bottom surfaces of a carbon substrate of cup shape, and removing the carbon substrate therefrom, thus leaving the sprayed coating as a sprayed body,
the sprayed body consisting of the ceramic sprayed coating of cup shape having a wall thickness of 0.5 to 5 mm and an inner diameter at its cylinder portion of 200 to 600 mm.

4. The sprayed article of claim 1 wherein the sprayed body comprises alternately sprayed layers of different rare earth oxides, or alternately sprayed layers of a rare earth oxide and a rare earth fluoride.

5. The sprayed articles of claim 1 wherein the sprayed coating comprises the same ceramic as the sprayed body.

6. A sprayed article consisting of a sprayed body of cylindrical or cup shape comprising a rare earth oxide and/or rare earth fluoride ceramic material and having a wall thickness of 0.5 to 5 mm and an outer diameter at its cylinder portion of 180 to 580 mm and a sprayed coating comprising a rare earth oxide and/or rare earth fluoride ceramic material formed on the outer circumferential surface of the cylinder portion of the sprayed body,
wherein the cylinder portion of the sprayed article has an ID roundness of 0.25 mm or less and/or an OD roundness of 0.20 mm or less.

7. The sprayed article of claim 6, wherein the sprayed body is obtained by forming a sprayed coating of ceramic particles of a rare earth oxide and/or rare earth fluoride on an inner circumferential surface of a carbon substrate of cylindrical shape, and removing the carbon substrate therefrom, thus leaving the sprayed coating as a sprayed body,
the sprayed body consisting of the ceramic sprayed coating of cylindrical shape having a wall thickness of 0.5 to 5 mm and an outer diameter 180 to 580 mm.

8. The sprayed article of claim 6, wherein the sprayed body is obtained by forming a sprayed coating of ceramic particles of a rare earth oxide and/or rare earth fluoride on inner circumferential and bottom surfaces of a carbon substrate of cup shape, and removing the carbon substrate therefrom, thus leaving the sprayed coating as a sprayed body,
the sprayed body consisting of the ceramic sprayed coating of cup shape having a wall thickness of 0.5 to 5 mm and an outer diameter at its cylinder portion of 180 to 580 mm.

9. The sprayed article of claim 6 wherein the sprayed body comprises alternately sprayed layers of different rare earth oxides, or alternately sprayed layers of a rare earth oxide and a rare earth fluoride.

10. The sprayed articles of claim 6 wherein the sprayed coating comprises the same ceramic as the sprayed body.

* * * * *